US006375568B1

(12) United States Patent
Roffman et al.

(10) Patent No.: US 6,375,568 B1
(45) Date of Patent: Apr. 23, 2002

(54) INTERACTIVE GAMING SYSTEM AND PROCESS

(75) Inventors: Arnold P. Roffman, Woodbridge; Mark J. Ross, New Haven, both of CT (US)

(73) Assignee: Interbet Corporation, Bethany, CT (US)

( * ) Notice: Subject to any disclaimer, the term of this patent is extended or adjusted under 35 U.S.C. 154(b) by 0 days.

(21) Appl. No.: 09/229,796

(22) Filed: Jan. 13, 1999

(51) Int. Cl.[7] .......... A63F 13/00

(52) U.S. Cl. .......... 463/26; 463/16; 463/25; 463/27; 463/42

(58) Field of Search .......... 463/20, 25, 26, 463/27, 42, 16–19, 21–22; 273/138.2, 143 R

(56) References Cited

U.S. PATENT DOCUMENTS

| | | | | |
|---|---|---|---|---|
| 5,564,700 A | * 10/1996 | Celona | 463/27 |
| 5,580,309 A | * 12/1996 | Piechowiak et al. | 463/16 |
| 5,772,509 A | * 6/1998 | Weiss | 463/16 |
| 6,012,982 A | * 1/2000 | Piechowiak et al. | 463/16 |
| 6,062,980 A | * 5/2000 | Luciano | 463/20 |
| 6,077,162 A | * 6/2000 | Weiss | 463/26 |
| 6,142,872 A | * 11/2000 | Walker et al. | 463/16 |
| 6,203,429 B1 | * 3/2001 | Demar et al. | 463/20 |
| 6,224,486 B1 | * 5/2001 | Walker et al. | 463/42 |
| 6,319,122 B1 | * 11/2001 | Packes, Jr. et al. | 463/16 |

* cited by examiner

*Primary Examiner*—Jessica J. Harrison
*Assistant Examiner*—Aiex F. R. P. Rada, II
(74) *Attorney, Agent, or Firm*—Raymond A. Nuzzo

(57) ABSTRACT

An interactive gaming process and system. The system comprises a plurality of gaming machines to be played by plurality of players. The system can be configured such that the gaming machines are either located in a casino or at internet locations. Each gaming machine comprises a wagering game and a theme game, respectively. The wagering game has features that correspond to the theme game wherein the results of the wagering game influence the results of the theme game as the wagering game is being played. The system also includes a controller for electronically linking the gaming machines and providing stimuli to the gaming machines so as to effect gaming machine outputs that are impartial and random. In one embodiment, the plurality of players play the wagering game as a group wherein if one player's theme game results meet predetermined criteria, that particular player will play for the group. The group will then have the opportunity to split a jackpot. In another embodiment, the plurality of players play as a group wherein activation of each player's wagering game either helps or hinders the group as a whole in its effort to achieve a predetermined goal. In a further embodiment, the players play their respective wagering game so as to directly compete against each other in the theme game. The results of the wagering games determines the winnings of each player, the eventual winner of the theme game and/or any predetermined jackpot.

41 Claims, 5 Drawing Sheets

INTERACTIVE GAMING SYSTEM AND PROCESS

BACKGROUND OF THE INVENTION

1. Field of the Invention

The present invention generally relates interactive gaming systems.

2. Problem to be Solved

Slot machines have become one of the most popular wagering games available at casinos. Casinos are not as numerous as state lottery terminals and off-track-betting parlors. Casinos are located in a few geographical locations, i.e. Las Vegas, Reno, Atlantic City, Monte Carlo, Connecticut, etc. Therefore, casinos are not readily available to most consumers. Consequently, it is not possible for everyone to travel to a casino and experience the excitement and challenge of playing the slot machines or other wagering games. For example, one reason may be that many prospective players of wagering games are financially unable to incur travel and lodging costs. Another reason may be that the prospective players do not have sufficient time in their schedules to permit travel to a casino. A further reason is that prospective players may be physically unable to travel due to physical handicaps, injuries, sickness, etc. What is needed is a gaming system and process that allows players to experience the challenge and excitement of playing unique and highly entertaining wagering games regardless of the (i) geographical location of the players, (ii) financial inability to travel to a casino, and (iii) physical inability of the players to travel to casinos.

It is an object of the present invention to provide a new and improved interactive gaming process and system.

It is another object of the present invention to provide a new and improved interactive gaming process and system that allows participation by players over the internet.

It is a further of the present invention to provide a new and improved interactive gaming process and system that provides the players with relatively more enjoyment and entertainment while playing a wagering game.

It is yet another object of the present invention to provide a new and improved interactive gaming process and system that provides players with the opportunity to play as a group or play against each other.

Other objects and advantages of the present invention will be apparent to one of ordinary skill in the art in light of the ensuing description of the present invention.

SUMMARY OF THE INVENTION

The present invention is directed to, in one aspect, an interactive gaming process comprising the steps of:

(a) providing a gaming system comprising:

(i) a plurality of gaming machines to be played by plurality of players, each gaming machine having a wagering game that provides a wagering game and a theme game, the wagering game having features that correspond to the theme game wherein the results of the wagering game influence the results of the theme game as the wagering game is being played, and (ii) a controller for electronically linking the gaming machines and providing stimuli to the gaming machines so as to effect gaming machine outputs that are impartial and random;

(b) configuring the gaming machines to a first pay-out scheme;

(c) activating each gaming machine to effect play of the wagering game and theme game wherein each gaming machine is activated by a corresponding player;

(d) controlling each gaming machine to play the theme game according to the results of the wagering game;

(e) determining if there is a player whose theme game results meet a first predetermined criteria;

(f) repeating steps (c)–(e) if in step (e), it is determined that there is no player whose theme game results meet the first predetermined criteria;

(g) designating the player whose theme game results meet the first predetermined criteria as the Leader;

(h) thereafter, configuring the gaming machines according to a second pay-out scheme;

(i) activating the gaming machines to effect play of the wagering game wherein each gaming machine is activated by a corresponding player;

(j) controlling each gaming machine to play the theme game according to the results of the wagering game;

(k) determining if the current Leader's theme game results still meet the first predetermined criteria;

(l) repeating steps (b)–(k) if it is determined in step (k) that the current Leader's theme game results no longer meet the first predetermined criteria;

(m) determining if any of the players' theme game results meet a second predetermined criteria if it is determined in step (k) that the current Leader's theme game results continue to meet the first predetermined criteria;

(n) repeating steps (b)–(m) if in step (m), it is determined that there is no player whose theme game results meet the second predetermined criteria; and (o) providing a proportional share of a jackpot to each player in the group of players if in step (m), it is determined that there is a player whose theme game results meet the second predetermined criteria.

In another aspect, the present invention is directed to an interactive gaming system comprising:

a plurality of gaming machines to be played by plurality of players, each gaming machine having a wagering game and a theme game, the wagering game having features that correspond to the theme game wherein the results of the wagering game influence the results of the theme game as the wagering game is being played;

a controller for electronically linking the gaming machines and providing stimuli to the gaming machines so as to effect gaming machine outputs that are impartial and random;

means for configuring the gaming machines to a first pay-out scheme;

means for activating each gaming machine to effect play of the wagering game;

means for controlling each gaming machine to play the theme game according to the results of the wagering game;

first means for determining if there is a player whose theme game results meet a first predetermined criteria;

means, responsive to the first determining means, for designating the player whose theme game results meet the first predetermined criteria as the Leader;

means for configuring the gaming machines according to a second pay-out scheme when the designating means designates a player as the Leader;

means for activating the gaming machines to effect play of the wagering game in the second pay-out scheme;

means for controlling each gaming machine to play the theme game according to the results of the wagering game;

second means for determining if the current Leader's theme game results still meet the first predetermined criteria;

third means for determining if any of the players' theme game results meet a second predetermined criteria; and means, responsive to the second and third determining means for providing a proportional share of a jackpot to each player in the group of players if the current Leader's theme game results still meet the first predetermined criteria, and at least one of the players' theme game results meet a second predetermined criteria.

In yet another aspect, the present invention is directed to a gaming process for use with the internet comprising the steps of:

(a) providing a gaming system comprising:
  (i) a plurality of gaming machines to be played by plurality of players, each gaming machine being located at a remote internet site, each gaming machine comprising a personal computer that is programmed to display (i) a video slot machine having a plurality of reels and a pay line, and (ii) a theme game, each reel having indicia thereon that corresponds to the theme game wherein the results of the theme game are influenced by the combination of indicia at the pay-line after the reels are spun, and
  (ii) a controller remote from the gaming machines for electronically linking the gaming machine and providing stimuli to the gaming machines so as to effect video slot machine outputs that are impartial and random;

(b) creating a wager account for each player;

(c) depositing funds into each wager account;

(d) configuring the gaming machines to a first pay-out scheme;

(e) activating each gaming machine to effect spinning of the reels of the video slot machine wherein each gaming machine is activated by a corresponding player;

(f) thereafter, deducting from each wager account a sum representing a wager;

(g) controlling each gaming machine to play the theme game according to the results of the video slot machine;

(h) determining if there is a player whose theme game results meet a first predetermined criteria;

(i) repeating steps (e)–(h) if it is determined that there is no player whose theme game results meet the first predetermined criteria;

(j) designating the player whose theme game results meet first predetermined criteria as the Leader;

(k) configuring the gaming machines according to a second pay-out scheme;

(l) activating the gaming machines to effect spinning of the reels of the video slot machine wherein each gaming machine is activated by a corresponding player;

(m) playing the theme game according to the resulting combination of indicia at the pay-line after each spin of the reels;

(n) determining if the current Leader's theme game results still meet the predetermined criteria;

(o) repeating steps (e)–(n) if it is determined in step (n) that the current leader's theme game results no longer meet the predetermined criteria;

(p) determining if any of the players' theme game results meet a second predetermined criteria if it is determined in step (n) that the current leader's theme game results still meet the first predetermined criteria;

(q) repeating steps (l)–(p) it is determined that there is no player whose theme results meet the second predetermined criteria; and (r) providing a proportional share of a jackpot to each player if in step (p), it is determined that there is a player whose theme game results meet the second predetermined criteria.

In a further aspect, the present invention is directed to an interactive gaming process comprising the steps of:

(a) providing a gaming system comprising:
  (i) a plurality of gaming machines to be played by a corresponding plurality of players, each gaming machine having a wagering game and a theme game, the wagering game having features that correspond to the theme game wherein the results of the wagering game influence the results of the theme game as the wagering game is being played, and
  (ii) a controller for electronically linking the gaming machines and providing stimuli to each gaming machine so as to effect gaming machine outputs that are impartial and random;

(b) configuring the gaming machines to a first pay-out mode;

(c) activating each gaming machine to effect play of the wagering game wherein each gaming machine is activated by a corresponding player;

(d) controlling all the gaming machines to play the theme game in each gaming machine according to the combined results of the wagering games of all the gaming machines;

(e) determining if all of the players' theme game results in combination achieve a first predetermined objective prior to the occurrence of a first predetermined event;

(f) repeating steps (c)–(e) if it is determined that the players' combined theme game results have not achieved the first predetermined objective and the first predetermined event has not yet occurred;

(g) controlling the gaming machines to terminate the theme game if the first predetermined event has occurred before the first predetermined objective is achieved;

(h) configuring the gaming machine to a second pay-out mode if it is determined that the players' combined theme game results have achieved the first predetermined objective before the occurrence of the first predetermined event;

(i) activating the gaming machines to effect play of the wagering game wherein the gaming machines are activated by the players;

(j) determining if all of the players' theme game results in combination achieve a second predetermined objective prior to the occurrence of a second predetermined event;

(k) repeating steps (i)–(j) if it is determined that the players' theme game results have not achieved the second predetermined objective and the second predetermined event has not yet occurred;

(l) controlling the gaming machines to terminate the theme game if the second predetermined event has occurred before the second predetermined objective is achieved; and (m) providing a proportional share of a jackpot to each player if in step (j), it is determined that the players' combined theme game results have achieved the second predetermined objective before the occurrence of the second predetermined event.

In yet another aspect, the present invention is directed to an interactive gaming process comprising the steps of:

(a) providing a gaming system comprising:

(i) a plurality of gaming machines to be played by a corresponding plurality of players, each gaming machine having a wagering game and a theme game, the wagering game having features that correspond to the theme game wherein the results of the wagering game influence the results of the theme game, and (ii) a controller for electronically linking the gaming machines and providing stimuli to each gaming machine so as to effect gaming machine outputs that are impartial and random;

(b) configuring the gaming machines to a first pay-out mode;

(c) activating each gaming machine to effect play of the wagering game wherein each gaming machine is activated by a corresponding player;

(d) controlling each gaming machine to play the theme game according to the results of the wagering game;

(e) determining if any player's theme game results meet a first predetermined criteria and designating that player as the winner;

(f) repeating steps (c)–(e) if it is determined that there is no winner;

(g) configuring the winner's gaming machine to a second pay-out mode;

(h) activating the winner's gaming machine to effect play of the wagering game wherein the gaming machine is activated by the winner; and (i) providing a monetary award to the winner based upon the results of the wagering game.

BRIEF DESCRIPTION OF THE DRAWINGS

The features of the invention are believed to be novel and the elements characteristic of the invention are set forth with particularity in the appended claims. The invention itself, however, both as to organization and process of operation, may best be understood by reference to the detailed description which follows taken in conjunction with the accompanying drawings in which:

DESCRIPTION OF THE PREFERRED EMBODIMENTS

In describing the preferred embodiments of the present invention, reference will be made herein to FIGS. 1–3, 3A and 3B of the drawings in which like numerals refer to like features of the invention.

In order to facilitate understanding the system and process of the present invention, the ensuing description is divided into two parts: (1) Architecture of the System of the Present Invention, and (2) One Embodiment of the Process of the Present Invention. The first part describes the preferred type of system architecture. The second part describes each step of one embodiment of the process of the present invention and the utilization of the aforementioned architecture to achieve efficient and proper implementation of the steps of the aforementioned process. It is to be understood that the system architecture described below constitutes one manner of implementing the particular steps of the aforementioned process and that other suitable architecture configurations can also be used.

1. Architecture of the System of the Present Invention

Figure 1:
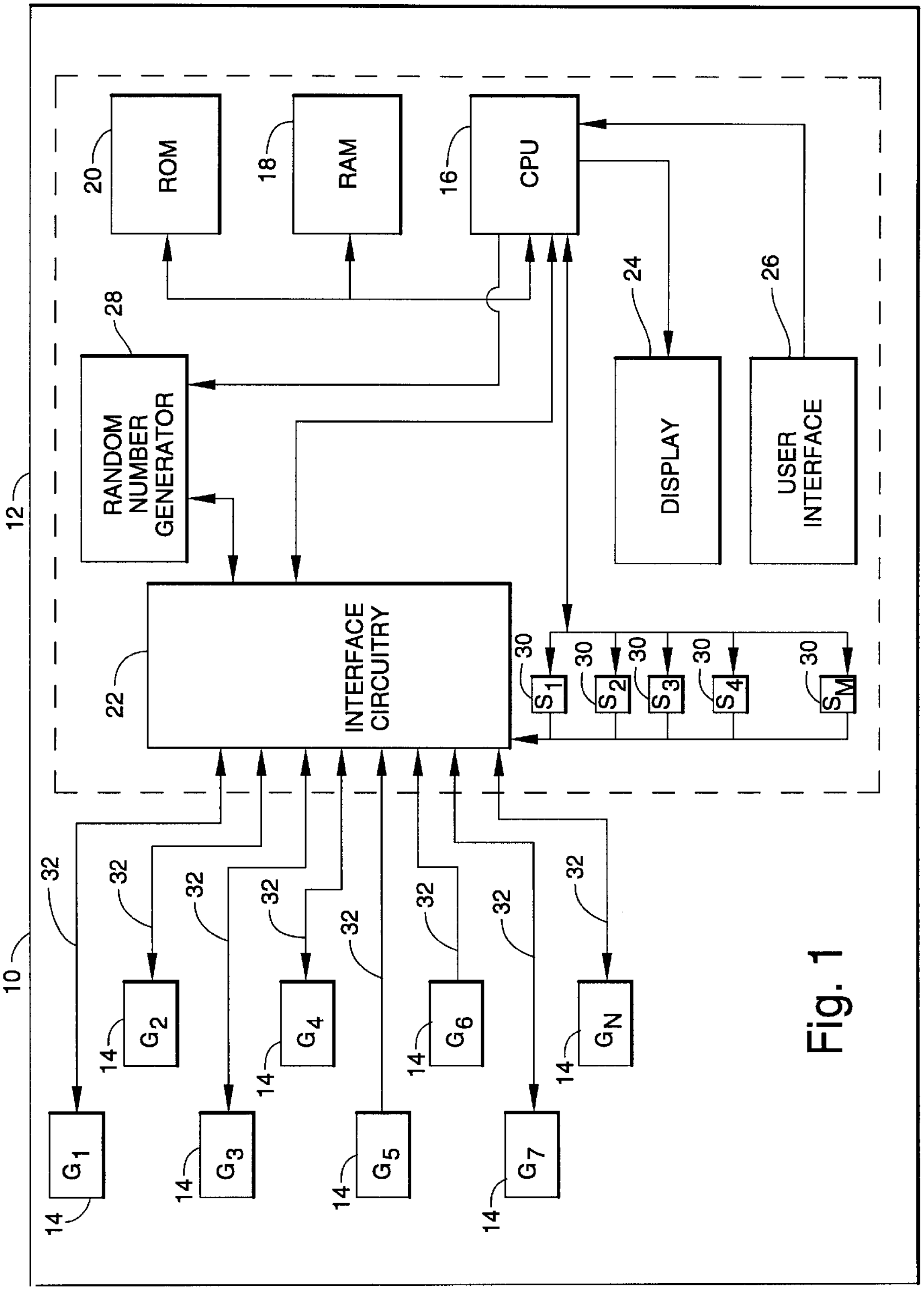
FIG. 1 is a block diagram of the interactive gaming system of the present invention.

Referring to FIG. 1, there is shown a block diagram of interactive gaming system 10 of the present invention. System 10 comprises controller 12 and a plurality of gaming devices or machines $G_1$, $G_2$, $G_3$, . . . $G_N$ (collectively referred to herein as "gaming machines 14"). Each gaming machine 14 has a wagering game that such as a multi-spinning reel type wagering game known in the art, e.g. video slot machines. Each gaming machine 14 includes at least one display screen for viewing the player's results as well as other player's results. If the wagering game is a video slot machine, then the display screen can be used to view the wagering game. Controller 12 is linked to and controls gaming machines 14. Controller 12 includes central processing unit ("CPU") 16, random access memory 18, read-only-memory 20, programmable interface circuitry 22, display 24, user interface 26, random number generator 28, and one or more servers $S_1$, $S_2$, $S_3$, . . . $S_M$ (collectively referred to herein as "servers" 30. Each server 30 is assigned to handle a specific number of gaming machines 14. Interface circuitry 22 includes multiplexing circuitry. However, it is to be understood that this multiplexing circuitry can be replaced with address/data bus and suitable decoders within each gaming machine 14. System 10 further includes communication links 32. Communication links 32 electronically link controller 12 with gaming machines 14. Random number generator 28 is in communication with and controls gaming machines 14, via interface circuitry 22, such that gaming machines 14 have totally impartial, random outputs as a function of stimuli provided by random number generator 28. Each of the gaming machines 14 are provided with an enabling means such as a push button, joy stick, video-game pad arm or "touch screen" to activate and thus play the wagering game.

Referring to FIG. 1, programmable interface circuitry 22 may be programmed to effect data communication between gaming machines 14 and controller 12 when machines 14 and controller 12 are arranged in different configurations. In a preferred embodiment, controller 12 is located in one particular location and each gaming machine 14 is located at an internet location. In another embodiment, controller 12 and gaming machines 14 are located in the same physical location, e.g. within the same casino. When each gaming machine 14 is located at an internet location, each gaming machine 14 generally comprises the player's personal computer and the appropriate software. In a preferred embodiment, the player downloads software made available on the internet by servers 30. The software enables the player to communicate with controller 12 and to play the wagering game and the desired theme game.

When system 10 is configured such that gaming machines 14 are located at remote sites that are linked to the internet, the display screen of each player's personal computer is programmed to initially display the interior of a casino. The player can scroll using the keyboard or mouse to "move about the casino". In one embodiment, the player's personal computer and software are configured to provide "sounds" of a typical casino environment. The "casino" displayed on the display screen includes a plurality of groups or banks of slot machines. Each group of slot machines is associated with a particular theme game. Indicia is provided to identify which group of slot machines is associated with a particular theme game. Each slot machine is associated with an icon representing a chair or stool. When the player decides to play a slot machine that is associated with a particular theme game, he or she uses a computer mouse to "click" on the "chair icon" in front of a slot machine that is part of the bank of gaming machine associated with the desired theme game. System 10 then "tags" that particular chair with the player's name or alias that he or she uses on-line. The pre-programmed computer then provides a particular screen configuration that corresponds to the selected theme game. This is discussed in detail below.

System 10 can be controlled by a software program that effects implementation of the steps of the processes of the present invention. Thus, it is to be understood that system 10 can have any one of a variety of configurations, as described above, and that interface circuitry 22 can be configured by CPU 16 to handle data transfer between controller 12 and gaming machines 14 in a manner that is compatible with any of the particular configurations discussed above. It is also to be understood that controller 12, as described above, is just one example of a suitable controller and that other suitable controller architecture can also be used.

Gaming system 10 of the present invention can be played by one or more players. As will be described below, some of the theme games are configured so that a plurality of players playing at a particular bank of gaming machines can play as a group. If a group of players are playing gaming system 10, the group of players are referred to as a "Group". Contrarily, as will be described below, one of these theme games is configured in manner such that the players play against each other instead as a group. In a preferred embodiment, the system of the present invention allows all players to communicate with one another via e-mail while simultaneously playing the wagering games.

Although each of the gaming machines 14 may utilize any one of a variety of conventional wagering games, e.g. video slot machines, etc., as described above, the ensuing description is in terms of the wagering game comprising a three-reel video slot machine. However, it is to be understood that if the wagering game comprises a multi-reel-type wagering game, fewer than or more than three (3) reels may be used. Furthermore, it is to be understood that this type of wagering game is only one example and that other types of wagering games can be used.

Each gaming machine 14 further includes a "theme game". In a preferred embodiment, controller 12 provides the theme game in electronic or video format on the display screen of each gaming machine 14. In accordance with the present invention, the results of the wagering game are used to simultaneously play and influence the results of the theme game. As will be seen below, the results of the theme game determine the amount of the pay-out or pay-off to the players in the "Group". The theme game can embody almost any type of game, including another wagering game. For example, the theme game can be Baseball, Football, Soccer, Hockey, etc. The wagering game utilizes or incorporates particular features or characteristics of the theme game. This is described in detail below.

a) Theme Games

The present invention utilizes the theme games described below. It is to be understood that this list of particular theme games is not exhaustive. Thus, other theme games, not described below, may also be used. As shown below, there are a plurality of features associated with each theme game. The wagering game incorporates these features and uses these features not only to play the wagering game, but also to simultaneously influence the result of the theme game itself. Thus, if the wagering game comprises a video slot machine, each reel is configured to comprise symbols or indicia that represent the features of the theme game. Such a configuration is described below in detail. It is to be understood that the group of features shown for each theme game is not exhaustive and that other features may also be used.

Figure 3:
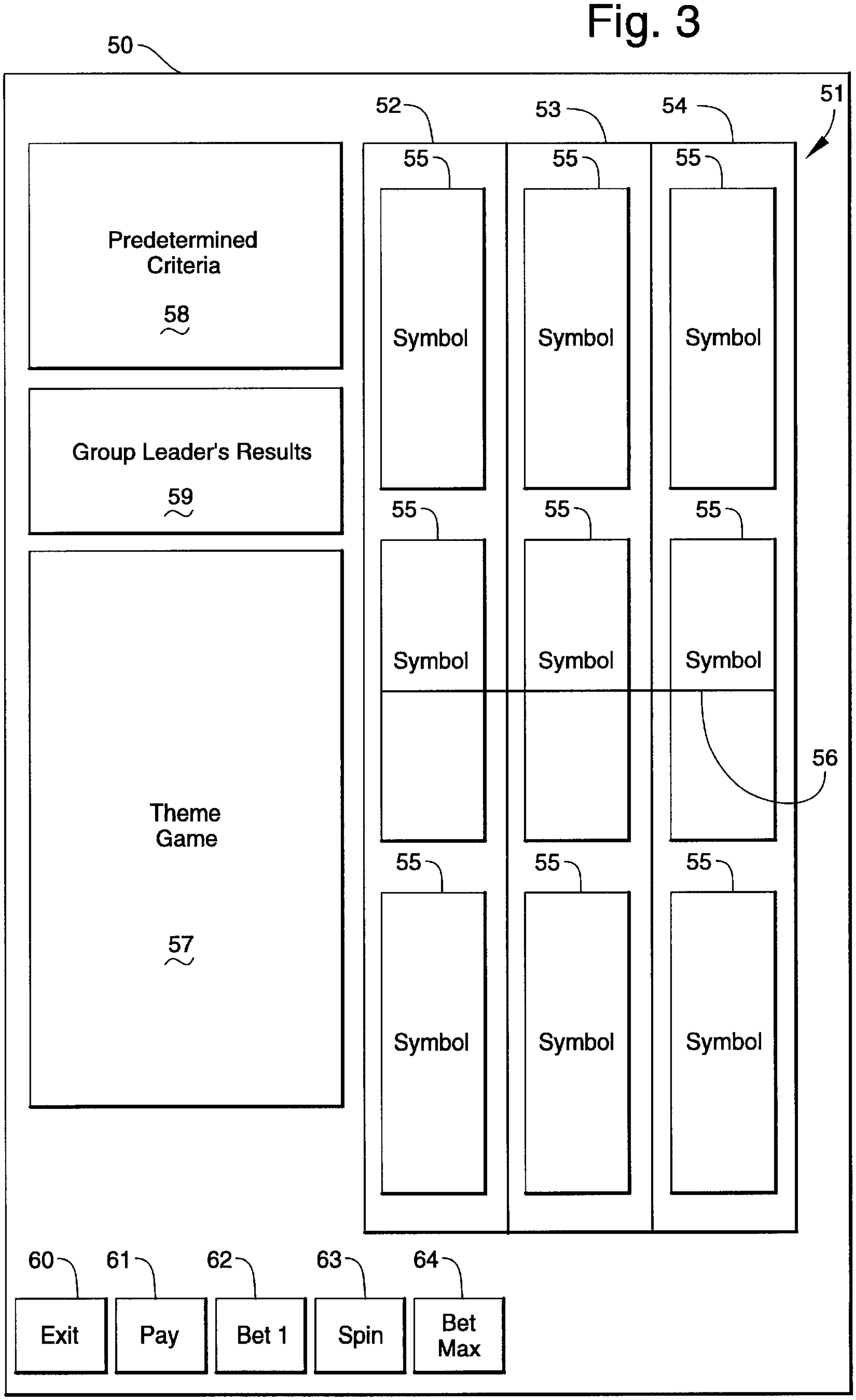
FIG. 3 illustrates one embodiment of a display screen configuration utilized by the system of the present invention.

Referring to FIG. 3, there is shown one embodiment of a display screen configuration displayed by the display screen of each gaming machine 14. Display configuration 50 is used to implement some of the theme games described below. Display configuration 50 comprises several portions wherein each portion displays predetermined information. In particular, display configuration 50 comprises portion 51 which displays reels 52, 53 and 54. Although this discussion is in terms of each gaming machine 14 providing a wagering game that comprises a video slot machine having three (3) reels, it is to be understood that fewer or more than 3 (three) reels can be used. Each of the reels 52, 53 and 54 include comprise a plurality of symbols or indicia 55 that represent features of a particular theme game. Display configuration 50 also displays pay-line 56. Display configuration 50 further includes portions 57, 58 and 59. Portion 57 displays the theme game. For example, if the theme game is football, display portion 57 displays a football field with indicia thereon that represent football players. In another example, if the theme game is baseball, portion 57 displays a baseball field. This will be discussed in detail below. Display portion 58 displays predetermined criteria required for (i) a player to become "Group Leader", (ii) increased winnings, or (iii) splitting the jackpot. Portion 59 displays the results of the player that has been designated the "Group Leader". This will be further discussed below.

As shown in FIG. 3, display configuration 50 also displays icons 60, 61, 62, 63 and 64. Each icon is associated with a specific function. If the gaming machines 14 are located at a remote site that is linked to the internet, then each player can "click" on any icon with his or her mouse to implement the function represented by the icon. For example, if a player "clicks" on "Exit" icon 60, the process of the present invention effects termination of the wagering game (i.e. video slot) as well as the theme game. Display 50 then displays the scene of the casino that was initially displayed when the player first logged-on. When a player "clicks" on "Pay" icon 61, display portions 57, 58 and 59 cease displaying "Predetermined Criteria", "Group Leader's Results" and "Theme Game", respectively, and instead display a table indicating the pay-off for particular combinations of symbols 55. Each theme game uses a different pay-off schedule. This is discussed in detail below. Each player places a predetermined minimum bet by "clicking" on "Bet 1" icon 62. The player then "clicks" on "Spin" icon 63 to spin reels 52, 53 and 54. If the player desires to place a predetermined maximum bet, the player then "clicks" on "Bet Max" icon 64 which registers the wager or bet and automatically effects spinning of reels 52, 53 and 54.

It is to be understood that the functions represented by icons 60, 61, 62, 63 and 64 can also be implemented by push-buttons, "touch screen", joy stick or video-game pad arm. Thus, if gaming machines 14 are located in a casino, each gaming machine 14 can be configured to utilize push buttons as used in conventional slot machines. Furthermore, the "spin" function can also be implemented by a "lever" used on conventional slot machines.

1) Theme Game #1: Baseball

The features of Theme Game #1 are shown in Table IA below.

TABLE IA

| |
|---|
| Strike |
| Line-Out |
| Fly-Out |
| Sacrifice Bunt |
| Ball |
| Single |
| Double |
| Triple |
| Home Run |

Referring to FIG. 3, in accordance with the present invention, each of the reels 52, 53 and 54 displayed in portion 51 comprises symbols or indicia 55 that represent each of the features listed above in Table IA. Portion 57 displays the theme game. Hence, video display portion 57 displays a baseball field. Display portion 57 further displays indicia representing Balls, Strikes, Outs and Runs. Display portion 59 displays the predetermined criteria for (i) becoming a Group Leader, (ii) increased payoffs, and (iii) splitting the jackpot. In one embodiment, the Baseball theme game has the following rules and characteristics:

i) In one embodiment, if two or more symbols or indicia of the same kind arrive at pay-line 56, then the theme game is advanced according to that particular symbol. For example, referring to FIG. 3, if reels 52 and 53, or 53 and 54, or 52 and 54, display the symbol HOME RUN at pay-line 56, that player will score at least one run. Display portion 57 is then updated to reflect that a run has been scored. In a preferred embodiment, display portion 51 also displays images of baseball players running the bases on the field so as to signify that spinning reels 52, 53 and 54 has resulted in a base hit, i.e. single, double, triple, etc.;

ii) The Group Leader is referred to as the "Lead Batter";

iii) The first player to score four (4) or more runs before three (3) outs becomes the Lead Batter for the Group. Once a Lead Batter is established, the Lead Batter's name appears in display portion 59. Each of the other players will watch the Lead Batter's ball game from that point forward until the Lead Batter receives three (3) outs. Once the Lead Batter receives three (3) outs, the Lead Batter's name is removed from display portion 59. Controller 12 then changes the payoff or pay-out scheme back to the original or normal pay-off scheme. The Lead Batter position is then "up for grabs".

iv) If there is no Lead Batter for the particular group or bank of gaming machines 14, then each player watches the progress of his or her own ball game. If the player gets three (3) outs, the display of that player's machine is reset to clear any data associated with BALLS, STRIKES, OUTS and RUNS;

v) When a player becomes the Lead Batter, his or her gaming machine 14 is automatically configured into an "Automatic Spin" mode wherein spinning is continuous until three (3) outs occur or a total of 100 spins among the Group. If the Lead Batter's wager account should become depleted, the Lead Batter will be disqualified from the game. Controller 12 then changes the payoff or pay-out scheme back to the original or normal pay-off scheme.

vi) Once the Lead Batter is established, the entire Group advances to the Playoffs, and the payoffs for everyone in the Group are multiplied by two or more. This information is displayed by display portion 58. During this period, the gaming machines in this particular group or bank of machines 14 become disabled for any prospective player that wishes to join the Playoffs in progress. If gaming machines 14 are located at remote locations linked to the internet, then this "disabling" function is implemented by preventing a prospective player from "clicking" on the image of a chair or stool located in front of a slot machine that is part of this particular bank of slot machines;

vii) If the Lead Batter scores ten or more runs before three (3) outs, the entire team advances to the World Series, and payoffs for everyone in the Group are multiplied by ten (10). Display portion 58 notifies the players that the payoffs are now multiplied by ten (10);

viii) If during the Playoffs or World Series, any player receives three (3) HOME RUN symbols on pay-line 55 while the Lead Batter has bases loaded, the entire Group splits the progressive jackpot. If the bases are not loaded, the players will divide 10% of the jackpot.

It is to be understood that the rules and characteristics described above are used in one embodiment of the present invention. Other rules and characteristics not mentioned above can be also be used.

An example of a payoff table used in the Baseball theme game is shown in Table IB. It is to be understood that for purposes of brevity, Table IB shows only a portion of the payoff table. This table shows only some of the possible combinations of symbols and the corresponding "coin payoff". The information shown in Table IB is stored in random access memory 18 (see FIG. 1).

TABLE IB

| | | | |
|---|---|---|---|
| Home Run | Home Run | Home Run | Three Home Run symbols during the playoffs or world series enables all players to split the jackpot. |
| Home Run | Home Run | Home Run | Three Home Runs at any other time entitles the player obtaining this combination to share 10% of the jackpot. |
| | | Coins Returned | Per One Coin Bet |
| Single | Single | Single | 7 Coins |
| Triple | Triple | Triple | 100 Coins |
| Ball | Ball | Ball | 5 Coins |

2) Theme Game #2: Football

The features of this theme game are shown below in Table IIA.

TABLE IIA

| |
|---|
| Sack-12 yard loss |
| Interception |
| Incomplete Pass |
| 4 yard rush |
| 5 yard pass |
| 7 yard screen pass |
| 15 yard pass |

TABLE IIA-continued

| |
|---|
| Touchdown |
| Defensive Penalty-First Down |

Referring to FIG. 3, when the theme game is football, each of the reels 52, 53 and 54 displayed in portion 51 is configured to comprise symbols or indicia 55 that represent each of the features listed above in Table IIA. Display portion 57 displays the theme game. Thus in this particular configuration, display portion 57 displays a football field with indicia representing football players, e.g. "X", "O". In a preferred embodiment, display portion 57 further displays indicia for indicating the: (i) "down", i.e. $1^{st}$, $2^{nd}$, $3^{rd}$ or $4^{th}$, (ii) number of yards needed for a first down, and (iii) position of the football. For example, in one embodiment, such indicia would appear as follows: "1st and 10 at 20 yard line". The Football theme game has the following rules and characteristics:

i) In one embodiment, if two or more symbols or indicia of the same kind arrive at pay-line 56, then the theme game is advanced according to that particular symbol.

For example, referring to FIG. 3, if reels 52 and 53, or 53 and 54, or 52 and 54, display the symbol TOUCHDOWN at pay-line 56, then that player scores a Touchdown. Display portion 57 is then updated to reflect that a Touchdown has been scored.

ii) The first player to bring his or her team past the 50 yard line before four (4) downs becomes the Group Leader or the "Quarterback" for the Group. Payoffs for the entire team are now multiplied by two (2). Once a Quarterback is established, each player will see the Quarterback's name and progress in display portion 59. Display portion 59 displays the Quarterback's name and progress until the Quarterback is intercepted or fails to reach the next first down. Once a Quarterback loses the ball, display portion 59 is cleared so as to remove the Quarterback's name and associated data. Display portion 57 then is then reset to show the football positioned back at the 20 yard line. All the players may now compete for the Quarterback position. The payoffs revert back to the normal payoff schedule.

iii) If there is no Quarterback for a particular group or bank of gaming machines 14, each player watches the progress of his or her own football game. If the player loses the ball, display portion 57 is reset so as to position the ball back on the 20 yard line.

iv) When a player becomes the Quarterback, their gaming machine is automatically configured into an "Automatic Spin" mode wherein spinning is continuous until the Quarterback loses the ball or if the total number of "spins" by the Group reaches a predetermined number. For example, the "Automatic Spin" mode is terminated if the total number of spins by the Group reaches one hundred (100) spins. If the Quarterback's wager account should become depleted, the Quarterback will be disqualified from the game. Display portion 57 is then reset to show the football back at the 20 yard line. All the players may now compete for the Quarterback position. The payoffs revert back to the normal payoff schedule.

v) When a player is designated as Quarterback, the payoffs for all players sitting at the particular bank or group of gaming machines 14 are doubled. Display portion 58 displays information that notifies the players that the payoffs are now doubled. During this period, the gaming machines 14 in this particular group or bank of machines become disabled for any prospective player that wishes to play with the Group. If gaming machines 14 are located at remote locations linked to the internet, then this "disabling" function is implemented by preventing a prospective player from "clicking" on the image of a chair in front of a slot machine that is within this particular group or bank of slot machines.

vi) If the Quarterback makes it beyond the opponent's 20 yard line, payoffs for the entire team are multiplied by five (5). This information is displayed by display portion 58.

vii) If any player receives three (3) Touchdown symbols during "times 5" payoffs, the Group shares the jackpot. In all other cases, that player receives 10% of the jackpot.

viii) If any player in the Group receives two or more TOUCHDOWN symbols or scores a touchdown and there is no Quarterback, then the player who received these symbols or scored the touchdown becomes the Quarterback and the entire Group starts at the opposition's 20 yard line with payoffs being doubled. Display portion 58 displays information that informs the players that the payoffs are now doubled.

ix) If any player in the Group receives two (2) or more TOUCHDOWN symbols or scores a touchdown and (1) there is a Quarterback, and (2) the Group is past the 50 yard line, then the entire Group starts at the opposition's 20 yard line with payoffs being multiplied by a predetermined factor. In one embodiment, this predetermined factor is two (2). In another embodiment, the predetermined factor is five (5). Display portion 58 notifies the players that the payoffs are now multiplied by the predetermined factor.

The Football theme game uses a predetermined payoff schedule. A table containing the payoff schedule information is shown in Table IIB. It is to be understood that for purposes of brevity, Table IIB shows only a portion of the payoff schedule. Table IIB shows only some of the possible combinations of symbols and the corresponding "coin payoff". The information shown in Table IIB is stored in random access memory 18 (see FIG. 1). The indicia "?" shown below in Table IIB means that any symbol can be used with the required symbols. Thus, the combination of symbols TOUCHDOWN TOUCHDOWN ? means that the player must receive two TOUCHDOWN symbols in combination with any other symbol in order to receive 10 (ten) coins for a one (1) coin bet.

TABLE IIB

| | | | |
|---|---|---|---|
| Touchdown | Touchdown | Touchdown | Entire Group splits jackpot if a player receives 3 Touchdown when beyond the opponent's 20 yard line. |
| Touchdown | Touchdown | Touchdown | All other cases, player wins 10% of jackpot |
| Coins Returned Per One Coin Bet | | | |
| Touchdown | Touchdown | ? | 10 Coins |
| 15 yard pass | 15 yard pass | 15 yard pass | 100 Coins |
| 15 yard pass | 15 yard pass | ? | 6 Coins |

c) Theme Game #3: The Heist

There are two sets of features for the Heist theme game. The first set of features is shown in Table IIIA below. The second set of features is shown in Table IIIB. Similar to the theme games discussed above, these features are represented by symbols or indicia on the reels of the video slot machine.

TABLE IIIA

| |
|---|
| One Gold Bar |
| Two Gold Bars |
| Three Gold Bars |
| Red Ruby |
| Onyx |
| Diamond |
| Diamond Ring |
| Credit Card |
| Gold Coin |

TABLE IIIB

| |
|---|
| Switch Cars |
| Police Helicopter |
| Train Crossing |
| Men At Work |
| Police Back-Up |
| Fuel Gauge Indicating Low Reserve |
| Find Ammo |
| Jam Police Radio |
| Find Secret Tunnel |

Figure 3A:
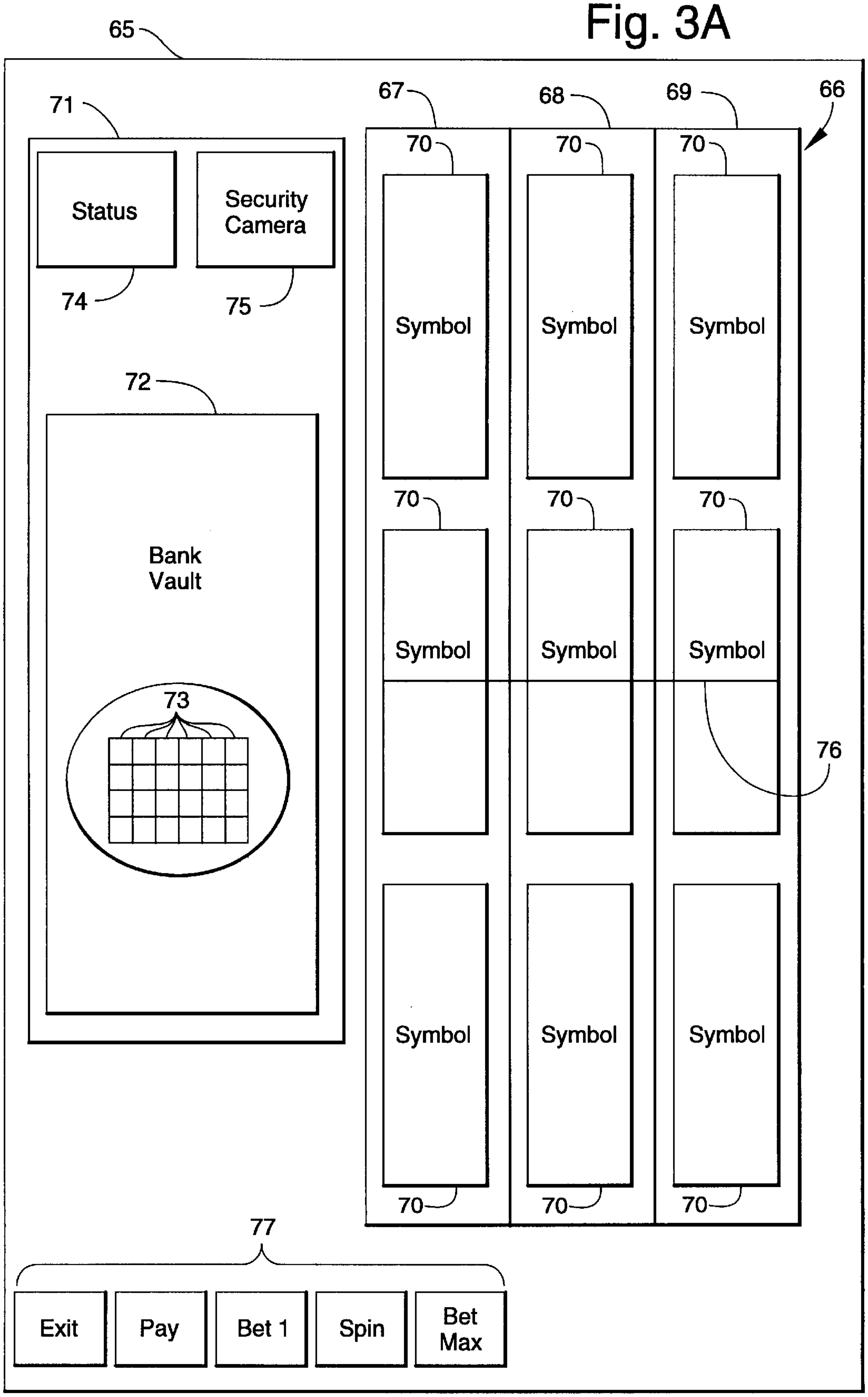
FIG. 3A illustrates another embodiment of a display screen configuration utilized by the system of the present invention.

Referring to FIG. 3A, there is shown display screen configuration 65 for use with the Heist theme game. Display screen configuration 65 comprises portion 66 wherein reels 67, 68, and 69 are displayed. In a first phase of this theme, each reel 67, 68 and 69 comprises symbols or indicia 70 that represent each of the features listed above in Table IIIA. In a second phase of the game, each reel 67, 68 and 69 comprise symbols or indicia 70 that represent each of the features listed above in Table IIIB. Portion 71 displays images that are associated with either phase of the Heist theme game. This will be described below in detail.

The rules and characteristics of the Heist theme game are as follows:

i) There are two phases of this theme game: Phase 1 and Phase 2. In Phase 1, the Group of players join efforts in stealing gold bars from a vault, and the video slot machine uses symbols or indicia 70 that represent the features shown in Table IIIA. In Phase 2, the Group attempts to abscond with the gold bars using a "getaway car", and the video slot machine is reconfigured to use symbols or indicia 70 that represent the features shown in Table IIIB.

ii) Referring to FIG. 3A, during Phase 1, display portion 71 displays bank vault 72 having gold bars 73, Status Window 74 and Security Camera Window 75.

iii) During Phase 1, the Group must remove fifteen (15) gold bars from vault 72. Every time a player spins and obtains three (3) GOLD BAR symbols at pay line 76, one of the gold bars 73 is removed from bank vault 72.

iv) Status Window 74 provides status information generated by the bank's electronic computer system. This status information includes the following information:
1) police alarm activated;
2) sealing outer door to a room housing the vault;
3) sealing complex doors of the vault; and
4) police units dispatched.

iv) Once a player steals a gold bar from the safe, the bank's Security Camera window 74 displays that particular player's name and face. In a preferred embodiment, the face actually shown is that of the image of the player that is created when the player "clicks" on a chair or stool as described above.

v) Once the police alarm is activated, Status Window 74 periodically displays a city grid that shows a blinking red dot that represents a police car and a yellow square that represent the bank. The Group must remove all the gold bars 73 from the vault before the red dot (i.e. the police) reaches the bank. Thus, removing all the gold bars 73 from the vault is referred to as the first predetermined objective and the arrival of the police at the bank is referred to as the "first predetermined event". If the police arrive at the bank before the all the gold is removed from the vault, the entire Group is caught and jailed. Display screen configuration 65 is then reconfigured to cease displaying portions 66 and 71 and instead display a plurality of vertically oriented bars thereby signifying that the entire Group has been caught by the police and is now in jail.

vi) Phase 2 begins once the Group removes all of gold bars 73 from vault 72. When Phase 2 begins, display portion 71 is configured in a manner such that reels 67, 68 and 69 display symbols or indicia that represent the features shown in Table IIIB. The group of features shown in Table IIIB is comprised of a first type that represent events or acts that would assist the Group in its escape with the gold bars, and a second type that represent events or acts that would impede the Group's progress and instead, assist the police in their pursuit of the Group. Additionally, in Phase 2, display portion 71 is configured to show a grid of the city in which the bank is located. The grid shows city streets, the police units, the location of the Group's "getaway" car and the Group's hideout. When Phase 2 begins, the police unit is exactly ten (10) miles behind the Group's getaway car. The goal is for the Group's getaway car to reach their hideout that is approximately 32 miles away. Thus, the successful escape of Group to their hideout is the second predetermined objective, and the apprehension of the Group by the police before the Group reaches their hideout is referred to as the "second predetermined event".

vii) During Phase 2, the players spin reels 67, 68, and 69 as in Phase 1. However, in Phase 2, the resulting combination of symbols 70 at pay line 76 determines (i) the progress of the Group in their effort to escape, or (ii) the progress of the police in their effort to apprehend the Group. During Phase 2, two or more of any symbol on Pauline 76 advances the action of the game by that symbol. Thus, two or more of any symbol on pay-line 76 determines whether the Group's getaway car advances one (1) or two (2) miles or whether the police car advances one (1) or two (2) miles. These distances are just examples. Other distances can also be used.

viii) Display portion 71 also displays the player's actions which caused the progression of the Group (i.e. the getaway car), or of the police. For example, if a player should receive two (2) or more JAM POLICE RADIO symbols at pay-line 76, then that player's name and face is shown in an upper portion of display portion 71 (above the grid of the city) along with the specific act committed by the player, i.e. "jamming the police radio". Since "jamming the police radio" would assist the Group in its escape, the Group's getaway car would advance by one (1) or two (2) miles with respect to the police. After each spin of the reels by each player, the police and getaway car are repositioned on the grid.

ix) Once the police car catches up to the getaway car, the game is over. The entire Group is caught and jailed. Display screen configuration 65 is then configured to display vertically oriented bars thereby signifying that the entire Group has been caught and is now in jail.

x) If the Group manages to drive the getaway car all the way to the hideout, all players in the Group split the progressive jackpot.

xi) During Phase 2, all payoffs are doubled for three (3) coin bets.

xii) Similar to the other theme games described above, the Heist theme game uses a particular payoff schedule. Table IIIC illustrates a portion of this payoff schedule that is used in one embodiment of the Heist theme game. It is to be understood that for purposes of brevity, Table IIIC shows only a portion of the payoff schedule.

TABLE IIIC

Any Three (3) Gold Bars On Pay-Line Steals A Gold Bar From Vault

| | Coins Returned Per One Coin Bet | | |
|---|---|---|---|
| Single Gold Bar | Single Gold Bar | Single Gold Bar | 30 Coins |
| Single Gold Bar | Single Gold Bar | ? | 10 Coins |
| Gold Coin | Gold Coin | Gold Coin | 8 Coins |

The "?" symbol has the same meaning as described above. Thus, two (2) Gold Bar symbols in combination with any other symbols would yield a ten (10) coin payoff for a one (1) coin bet.

Display configuration 65 further displays icons generally designated by the numeral 77. These icons perform the same functions as icons 60–64 that were described above.

d) Theme Game #4: Demolition Derby

The Demolition Derby theme game uses two sets of features. Table IVA shows the features used in a first phase of this theme game. Table IVB shows the features used in a second phase of this game.

TABLE IVA

| |
|---|
| First Place Blue Ribbon |
| Smash Fender |
| Crunch Grill |
| Safe Driver |
| Kill Engine |
| Flatten Tire |
| Rupture Radiator |
| Bang Bumper |
| Dent Door |

TABLE IVB

| |
|---|
| 0 |
| 1 |
| 2 |
| 3 |
| 4 |
| 5 |
| 6 |
| 7 |
| 8 |
| 9 |
| Image of Treasure Chest |

Unlike the Baseball, Football and Heist theme games discussed above, Demolition Derby requires that all players play against each other instead of as a Group.

Figure 3B:
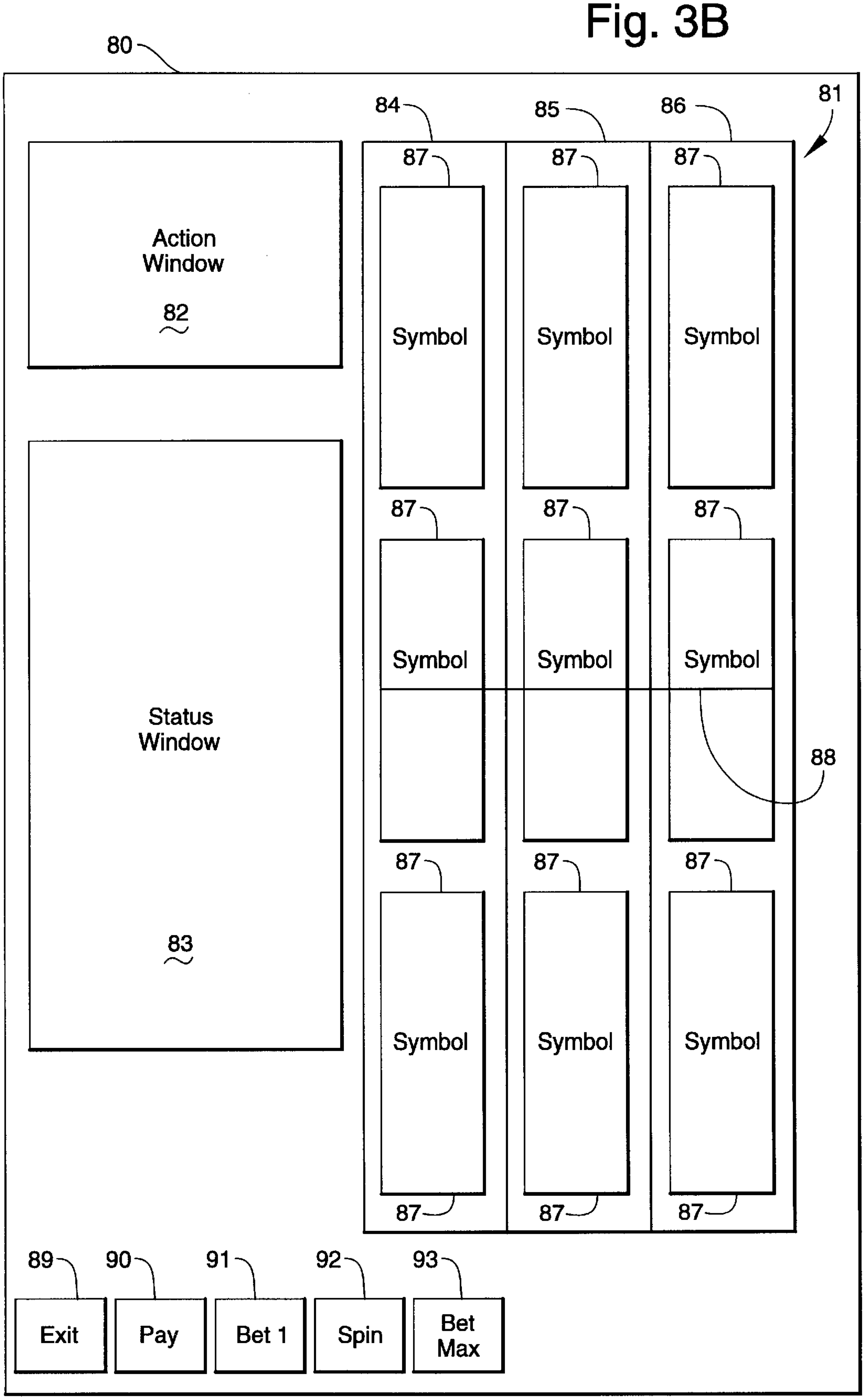
FIG. 3B illustrates a further embodiment of a display screen configuration utilized by the system of the present invention.

Controller 12 controls gaming machines 14 that are associated with the Demolition Derby theme game to configure display screen to provide display configuration 80 shown in FIG. 3B. Display configuration 80 comprises several portions wherein each portion displays particular information. In particular, display configuration 80 comprises portion 81 which displays reels 84, 85 and 86. Although this discussion is in terms of the wagering game of each gaming machine 14 comprising a video slot machine having three (3) reels, it is to be understood that fewer or more than 3 (three) reels can be used. Each of the reels 84, 85 and 86 comprise a plurality of symbols or indicia 87 that represent the features of the Demolition Derby theme game which are shown above in Table IVA. Display configuration 80 also displays pay-line 88. Display configuration 80 further includes portions 82 and 83. Portion 82 is referred to as an "Action Window" and portion 83 is referred to as a "Status Window". The purposes of the Action and Status Windows are discussed below.

As shown in FIG. 3B, display configuration 80 also displays icons 89–93 that perform the same function as 60–64, respectively, that were discussed above. Each icon is associated with a specific function. If the gaming machines 14 are located at a remote site that is linked to the internet, then the player "clicks" on any icon with his or her mouse to implement the function represented by the icon. For example, if a player "clicks" on "Exit" icon 89, the process of the present invention effects termination of the wagering game (i.e. video slot) as well as the theme game. Display configuration 80 is then reconfigured to display the scene of the casino that was initially displayed when the player first logged-on. When a player "clicks" on "Pay" icon 90, display portions 82 and 83 cease displaying data associated with the "Action Window" and the "Status Window", respectively, and instead display a table indicating the payoff for particular combinations of symbols. The payoff table is discussed below. Each player places a predetermined minimum bet by "clicking" on "Bet 1" icon 91. The player then "clicks" on "Spin" icon 92 to spin reels 84, 85 and 86. If the player desires to place a predetermined maximum bet, the player then "clicks" on "Bet Max" icon 93 which registers the wager or bet and automatically effects spinning of reels 84, 85 and 86.

The reels of the video slot machine are configured (via controller 12) so as to use indicia that represents the features shown in Table IIIA only when the Demolition Derby theme game is used in a first phase of play. When the Demolition Derby theme game is used in a second phase of play, which will be discussed below, display configuration 80 is controlled to reconfigure reels 84, 85 and 86 to cease displaying the symbols shown in Table IVA above, and instead display symbols and indicia shown in Table IVB. When the Demolition Derby theme game is in the second phase, each player is entitled to only a single "spin" of reels 84, 85 and 86.

The rules and characteristics of the Demolition Derby theme game are as follows:

i) In one embodiment, if two symbols or indicia of the same kind arrive the pay-line 88, then the Demolition Derby is advanced according to that particular symbol.

ii) The Status Window shows a plurality of images of vehicles. As used herein, the term vehicle is defined to include automobiles, trucks, buses, motorcycles, bicycles, etc. In a preferred embodiment, the vehicle is an automobile such as a racing car. The name of each player is displayed next to a corresponding automobile.

iii) The Status Window also shows several images next to each automobile that represent automobile components. Each component corresponds to one of the features on reels 84, 85 and 86. In one embodiment, the automobile components are the following: (i) grille, (ii) radiator, (iii) engine, and (iv) three (3) tires. When each player is involved in a crash, an auto component image disappears from the Status Window. The particular component that actually disappears depends upon the combination of symbols 87 arriving at pay-line 88.

iv) A player's car is "destroyed" when a competing player does either of the following: (1) destroys, in order, the player's grille, radiator and then the engine, or (2) destroys three (3) tires of the player's car. Each player receives one (1) point when he or she destroys a competing player's car, and loses a point when his or her car is destroyed. Each player's point totals are shown in the Status Window next to the image of that player's automobile.

v) It does not matter which player sets up an automobile for the "kill" (i.e. the destruction of the automobile); the player making the "final kill" on the particular automobile will receive points for destroying it.

vi) Display portion 82, which is referred to as the Action Window, shows the automobiles crashing into each other. In one embodiment, the automobile inflicting the damage is always on the right. The Action Window also displays what type of damage has been inflicted. The type of damage being inflicted depends upon the combination of indicia at pay-line 88. For example, if the Action Window displays FLATTEN TIRE, then the automobile sustaining damage will lose a tire. Thus, the Status Window is updated to show that the particular automobile sustaining the damage has lost a tire.

vii) Controller 12 (i.e. the computer) can be configured to "play" against the real players. However, a player will not receive any points or credit for "killing" an automobile assigned to the controller 12.

viii) If a player destroys five (5) or more cars, that player will have the opportunity to spin the reels 84, 85 and 86 in the second phase. In the second phase, display configuration 80 is controlled to change symbols 87 to numbers ranging from 0–9, inclusive, and symbols or indicia representing a "treasure chest" (see Table IVB above). The player who spins in the second phase wins a monetary amount that is represented by the numbers arriving at pay-line 88. Thus, for example, if the resulting combination of numbers arriving at pay-line 88 is "524", then the player wins $524. If three (3) "treasure chest" symbols arrive at pay line 88, that player wins the progressive jackpot. In one embodiment, a player is entitled to spin reels 84, 85 and 86 only once in the second phase.

ix) Any player that receives two or more SAFE DRIVER symbols at pay line 88 will have a vital automobile component restored that was lost in a previous crash. The Action Window will indicated which automobile component was restored.

Table IVC is one example of a payoff schedule used in the Demolition Derby theme game. It is to be understood that for purposes of brevity, Table IVC shows only a portion of the payoff schedule. Table IVC shows only some of the possible combinations of symbols and the corresponding "coin payoff". For example, the combination of three (3) SAFE DRIVER symbols results in a payoff of one-hundred (100) coins for a one (1) coin bet. The information shown in Table IVC is stored in random access memory 18.

TABLE IVC

| Coins Returned Per One Coin Bet | | | |
|---|---|---|---|
| SAFE DRIVER | SAFE DRIVER | SAFE DRIVER | 100 |

TABLE IVC-continued

| | | | |
|---|---|---|---|
| DENT DOOR | DENT DOOR | DENT DOOR | 20 |
| CRUNCH GRILLE | CRUNCH GRILLE | CRUNCH GRILLE | 3 |

It is to be understood that the theme games described above are just examples and that other theme games and/or features can be used. Furthermore, it is also to be understood that although the scenarios, images and information displayed via display screen configurations 50, 65 and 80 are used in preferred embodiments of the present invention, other scenarios, images and information can also be utilized.

In a preferred embodiment, all gaming machines 14 are configured to have the same theme game. In order to provide players with a choice of gaming machines 14 that have different theme games, casinos may use a plurality of groups or banks of gaming machines 14 wherein each group or bank of gaming machines incorporates a particular theme game. Players can enter/exit these groups of machines based on their own preferences. Similarly, if a user were at a remote site linked to the internet, the user would be able to choose from a plurality of groups of gaming machines 14 wherein each group of machines utilized a particular theme game. The user would then "double click", via a mouse, on the appropriate "chair" or "stool" icon associated with a bank or group of slot machines that incorporate the desired theme game.

The manner in which the players place their bets differ depending upon how system 10 is configured. For example, if system 10 is configured such that gaming machines 14 are located within a casino, then each gaming machine 14 is configured to have a coin slot, a currency validator and a credit card validator. Thus, the player can place bets by either inserting coins in the coin slot or inserting their credit cards in the validator. When system 10 is configured such that gaming machines 14 are located at remote internet locations, the players must first subscribe in order to play the gaming machine. Thus, the player will transmit requested subscriber information over the internet to controller 12. Once the player's subscriber information is accepted and approved, the player is provided with an account. The player deposits sums of money to the account via credit card, check, wire transfer, or any other suitable means. In a preferred embodiment, the player can replenish his or her account over the internet by transmitting the required credit card information and the desired dollar amount. Each time the player "spins", a predetermined required bet is automatically deducted from the player's account.

In a preferred embodiment, controller 12 controls gaming machines 14 to provide a predetermined time period within which the players must place a bet. This can be accomplished by timing circuitry or a timing module within controller 12. If a player does not place a bet within the required amount of time, his or her gaming machine 14 is automatically configured to prevent further "spinning" by that player thereby allowing other potential players in the queue to play the gaming machine 14.

2. One Embodiment of the Process of the Present Invention

Figure 2:
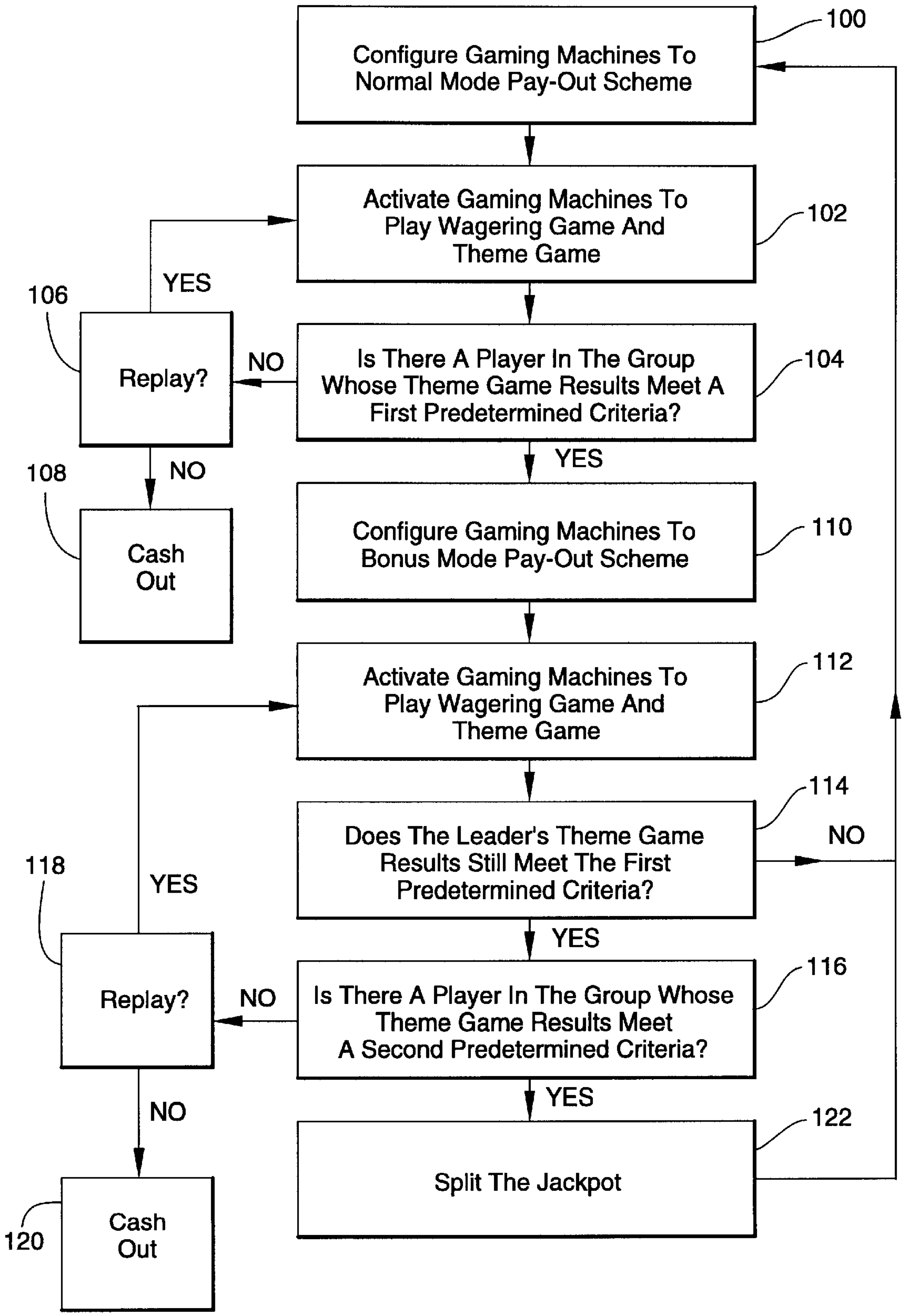
FIG. 2 is a flow chart illustrating one embodiment of the process of the present invention.

Generally, the process of the present invention comprises a first mode, referred to as the Normal Mode, and a second mode, referred to as the Bonus Mode. The flow chart illustrated in FIG. 2 pertains only to the embodiments discussed above wherein system 10 is configured such that gaming machine 14 utilizes either the Baseball or Football theme game. As shown in FIG. 2, the Normal Mode generally comprises steps 100–108, inclusive, and the Bonus Mode comprises steps 110–122, inclusive.

During both Normal and Bonus Modes, random number generator 28 is in communication with and controls gaming machines 14, via interface circuitry 22, such that gaming machines 14 have totally impartial, random outputs that are a function of stimuli provided by random number generator 28.

The Normal Mode a) The Normal Mode of the process of the present invention commences with step 100 wherein all gaming machines 14 are configured or set to a first predetermined pay-out scheme.

b) In step 102, the players in the Group place their bets and commence playing gaming machines 14. For example, if each gaming machine 14 has a wagering game that comprises a video-type slot machine, the players of the Group activate or play the wagering game to effect spinning of the reels of the slot machine. This can be accomplished by activating the enabling means discussed above, e.g. pressing the appropriate button, touching the screen, using a keyboard, etc. If each player of the Group is using a personal computer, then spinning the reels can be effected by "clicking", via a mouse, on a "SPIN" icon that is displayed on the screen of the players' gaming machines 14 (e.g. personal computers). As described above, after each spin of the reels, the result of the spin is used to influence or play the theme game.

c) In step 104, it is determined whether any of the players of the Group have theme game results that meet a predetermined criteria. The predetermined criteria is inputted into controller 12 via user interface 26. CPU 16 transfers the predetermined criteria to ROM 16. Thus, after each spin, each player's theme game results are compared to the stored, first predetermined criteria. The first player of the Group to have theme game results that meet the first predetermined criteria is designated as the "Group Leader". The following example is provided in order to facilitate understanding of this step.

EXAMPLE

In this particular example, the wagering game is three-reel video-slot machine and the theme game is baseball. Each reel of the video-slot machine has indicia or symbols that correspond to a feature or characteristic of baseball as described above. Thus, if a player in the Group spins the three reels of his or her video slot machine and three (3) "Home Run" symbols appear at the pay line of the video slot machine, then that particular player will score at least one run in the baseball game. (Such a scenario is described above in conjunction with FIG. 3). Therefore, each player achieves particular results in the theme game (i.e. baseball) as a result of playing the three-reel video slot machine. In this particular example, the predetermined criteria is to score five (5) runs before three (3) outs have occurred. Therefore, step 104 determines which player of the Group has scored five (5) runs before three (3) outs have occurred. The player that is the first to accomplish this is designated as the Lead Batter.

In step 104, if it is determined that a particular player's spin does not achieve the predetermined event, the process shifts to step 106 where it is determined if that particular player wishes to replay (i.e. "spin" again). If the player does not desire to replay, the process shifts to step 108 wherein that player's gaming machine 14 is configured in the "CASH OUT" mode. The player then cashes out of the game. If step 106 determines that the player desires to "spin" again, the process shifts to step 102 wherein that gaming machine 14 is reset or configured to allow that particular player to continue spinning.

If step 104 determines that one of the players in the Group has achieved the predetermined event, then that particular player is designated as the Group Leader (e.g. Lead Batter). Thus, steps 102, 104, 106, 107 and 108 are repeated until a Group Leader is selected. The process of the present invention then shifts to the Bonus Mode.

The Bonus Mode d) After a Group Leader is selected in step 104, the process shifts to step 110 wherein gaming machines 14 are configured in the "Bonus Mode" such that gaming machines 14 are controlled to provide payouts that are greater than the payouts provided in the Normal Mode. Specifically, the increased pay-out in the Bonus Mode is based upon a multiple of the pay-out of the Normal Mode.

e) Next, in step 112, all the players in the Group commence spinning the reels of their wagering games as described above. In a preferred embodiment, the Group Leader plays for the entire Group in the Bonus Mode. The other players of the Group can watch the Group Leader's results on display portion 68 (see FIG. 3) that is part of their gaming machine 14. Thus, the other players of the Group can watch the Group Leader as they continue playing (or spinning) themselves. In the Bonus Mode, the theme game is preferably the same game as played in the Normal Mode. Thus, if the theme game in the Normal Mode is Baseball, then the theme game in the Bonus Mode is preferably Baseball.

f) After every "spin" by the Group Leader, step 114 determines whether the Group Leader still qualifies to play for the Group. For example, if the predetermined criteria is to score five (5) runs before three (3) outs occur, but the Lead Batter receives three (3) outs while only scoring two (2) runs, then the Lead Batter loses his or her eligibility to play for the Group. In another example, if the Quarterback is intercepted or fails to get a first down, the Quarterback loses his or her eligibility to play for the Group. If step 114 determines that the Group Leader is no longer qualified to play for the Group, the process shifts back to step 100. Step 100 effects reconfiguration gaming machines 14 to provide Normal Mode pay-outs and the entire Group begins playing the gaming machines 14 in Normal Mode again. CPU 16 outputs control signals to gaming machines 14 that clears display portion 59 of each gaming machine 14. If step 114 determines that the Group Leader is still qualified to play for the Group, the process then shifts to step 116. Thus, steps 100–114 are repeated until the process shifts to step 116.

g) In step 116, the Group Leader continues to play for the Group as long as the Group Leader's theme game results continue to meet the first predetermined criteria. During this step, the other players in the Group are also playing or "spinning". In this step, it is determined if any of the players of the Group (including the Leader) has theme game results that meet a second predetermined criteria. In one embodiment, the second predetermined criteria comprises the attainment of three (3) specific symbols on pay-line 56 of the video slot machine. One example of the second predetermined criteria comprises the attainment of three (3) HOME RUN symbols on pay-line 56 and BASES LOADED in the baseball game (i.e. the theme game). Step 116 determines if any players in the Group have theme game results that meet the second predetermined criteria. If there is at least one such player in the Group, then all players in the Group will split the jackpot. This is discussed in detail below.

If step 116 determines that there is no player in the Group that has theme game results that meet the second predetermined criteria, then the process shifts to step 118. Step 118 determines whether the players of the Group, including the Group Leader, desire to replay, i.e. spin again. If any of the players of the Group do not wish to replay, then step 120 effects, via CPU 16, configuration of those players' gaming machines 14 to the "CASH OUT" mode. CPU 16 then reconfigures gaming machines 14 to provide a normal pay-off or pay-out scheme. If the Group Leader decides not to replay, the process shifts to step 100 wherein gaming machines 14 are reconfigured back to the Normal Mode. Furthermore, if at anytime during the Bonus Mode, the Group Leader decides not to play, i.e. leaves or abandons his or her gaming machine 14, the process automatically terminates the Bonus Mode and reverts back to step 100 wherein the gaming machines 14 are reconfigured back to the Normal Mode. Furthermore, if at any time the Group Leader does not place his or her bet within the required amount of time, the process shifts back to step 100 wherein the gaming machines 14 are reconfigured back to the Normal Mode.

If any player of the Group desires to replay, i.e. spin again, then step 118 effects shifting of the process to step 112 wherein those players' gaming machines 14 are configured, via CPU 16, to allow the players to continue spinning. Thus, steps 112–116 are repeated until step 116 determines that at least one of the players in the Group has theme game results that meet the second predetermined criteria. When this occurs, the process shifts to step 122 wherein CPU 16 outputs control signals to gaming machines 14 to enable the gaming machines 14 to pay out the appropriate share of the jackpot to each player in the Group. When the jackpot is split among the players of the Group, controller 12 terminates the Bonus Mode phase of play and effects shifting of the process back to step 100 wherein gaming machines 14 are reset or reconfigured to the Normal Mode so as to allow the entire game to be played again. The Bonus Mode is not offered again to the Group until it is re-earned in accordance with steps 102 and 104 discussed above.

The process illustrated in the flow charts shown in FIG. 2, is only one embodiment and pertains to the Baseball and Football theme games discussed above. As stated above, in a preferred embodiment, data pertaining to each theme game and wagering game is stored in RAM 18 and ROM 20. Thus, if it is desired to configure gaming machines 14 to provide the Demolition Derby theme game or the Heist theme game, then CPU 16 is controlled via interface 26 in order to activate the appropriate software routine stored in RAM 18 and ROM 20 so as to enable gaming machines 14 to provide the Demolition Derby theme game or the Heist theme game along with a video slot machine having indicia that corresponds to the Demolition Derby and Heist theme games. It is to be understood that controller 12 can be configured with the appropriate software to provide other types of theme games along with video slot machines with reels having the appropriate indicia.

Thus, the system and process of the present invention:

a) provide an entertaining way of playing a wagering game;

b) provide relatively more challenging wagering games;

c) can be implemented with a variety of commercially available software and hardware systems; and d) can be implemented at a reasonable costs.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An interactive gaming process comprising the steps of:

(a) providing a gaming system comprising:

(i) a plurality of gaming machines to be played by plurality of players, each gaming machine having a wagering game and a theme game, the wagering game having features that correspond to the theme game wherein the results of the wagering game influence the results of the theme game as the wagering game is being played, and (ii) a controller for electronically linking the gaming machines and providing stimuli to the gaming machines so as to effect gaming machine outputs that are impartial and random;

(b) configuring the gaming machines to a first pay-out scheme;

(c) activating each gaming machine to effect play of the wagering game and theme game wherein each gaming machine is activated by a corresponding player;

(d) controlling each gaming machine to use the results of the wagering game to simultaneously play and influence the results of the theme game;

(e) determining if there is a player whose theme game results meet a first predetermined criteria;

(f) repeating steps (c)–(e) if in step (e), it is determined that there is no player whose theme game results meet the first predetermined criteria;

(g) designating the player whose theme game results meet the first predetermined criteria as the Leader;

(h) thereafter, configuring the gaming machines according to a second pay-out scheme;

(i) activating the gaming machines to effect play of the wagering game wherein each gaming machine is activated by a corresponding player;

(j) controlling each gaming machine to play the theme game according to the results of the wagering game;

(k) determining if the current Leader's theme game results still meet the first predetermined criteria;

(l) repeating steps (b)–(k) if it is determined in step (k) that the current Leader's theme game results no longer meet the first predetermined criteria;

(m) determining if any of the players' theme game results meet a second predetermined criteria if it is determined in step (k) that the current Leader's theme game results continue to meet the first predetermined criteria;

(n) providing a proportional share of a jackpot to each player in the group of players if in step (m), it is determined that there is a player whose theme game results meet the second predetermined criteria; and (o) repeating steps (i)–(n) if in step (m), it is determined that there is no player whose theme game results meet the second predetermined criteria.

2. The process according to claim 1 wherein step (n) further includes the step of repeating steps (b)–(n) after the proportionate shares of the jackpot are distributed.

3. The process according to claim 1 wherein step (f) further comprises the steps of:

determining if each player desires to continue activating his or her respective gaming machine if it is determined that there is no player whose theme game results meet the first predetermined criteria; and configuring to a cash-out mode any gaming machine of a player who does not desire to continue activating his or her gaming machine.

4. The process according to claim 1 wherein step (o) further comprises the steps of:

determining if each player desires to continue activating his or her respective gaming machine if it is determined that there is no player whose theme game results meet the second predetermined criteria; and configuring to a cash-out mode any gaming machine of a player who does not desire to continue activating his or her gaming machine.

5. The process according to claim 1 wherein step (c) further comprises the step of placing wagers in each gaming machine before each gaming machine is activated.

6. The process according to claim 5 wherein each gaming machine includes a coin slot for receiving coins, the step of placing wagers in each gaming machine comprising the step of inserting coins in a coin slot of each gaming machine.

7. The process according to claim 5 wherein each gaming machine includes a credit card validator for receiving a credit card, the step of placing wagers in each gaming machine comprising the step of inserting a credit card in each credit card validator of each gaming machine.

8. The process according to claim 5 wherein the controller includes a memory storage device, for creating an account for each player, the step of placing wagers comprising the steps of:

creating an account for each player in the memory storage device;

depositing a first predetermined amount of money to each account; and deducting a second predetermined amount of money from each account for each time the player activates his or her gaming machine.

9. The process according to claim 5 further including the steps of:

measuring the amount of time after each wager is placed; and preventing a player from activating his or her gaming machine if the measured amount of time exceeds a predetermined amount of time.

10. The process according to claim 1 wherein the wagering game of each gaming machine comprises a video slot machine having a plurality of reels and a pay-line.

11. The process according to claim 10 wherein each reel of the video slot machine has indicia that represent features of the theme game.

12. The process according to claim 11 wherein controlling step (d) comprises the step of controlling each gaming machine to play the theme game according to the combination of indicia at the pay-line after the reels are spun.

13. An interactive gaming process comprising the steps of:

(a) providing a gaming system comprising:

(i) a plurality of gaming machines to be played by a corresponding plurality of players, each gaming machine having a wagering game and a theme game, the wagering game having features that correspond to the theme game wherein the results of the wagering game influence the results of the theme game as the wagering game is being played, and (ii) a controller for electronically linking the gaming machines and providing stimuli to each gaming machine so as to effect gaming machine outputs that are impartial and random;

(b) configuring the gaming machines to a first pay-out mode;

(c) activating each gaming machine to effect play of the wagering game wherein each gaming machine is activated by a corresponding player;

(d) controlling all the gaming machines to use the combined results of the wagering games of all the gaming machines to simultaneously play and influence the theme game in each gaming machine;

(e) determining if all of the players' theme game results in combination achieve a first predetermined objective prior to the occurrence of a first predetermined event;

(f) repeating steps (c)–(e) if it is determined that the players' combined theme game results have not achieved the first predetermined objective and the first predetermined event has not yet occurred;

(g) controlling the gaming machines to terminate the theme game if the first predetermined event has occurred before the first predetermined objective is achieved;

(h) configuring the gaming machine to a second pay-out mode if it is determined that the players' combined theme game results have achieved the first predetermined objective before the occurrence of the first predetermined event;

(i) activating the gaming machines to effect play of the wagering game wherein the gaming machines are activated by the players;

(j) determining if all of the players' theme game results in combination achieve a second predetermined objective prior to the occurrence of a second predetermined event;

(k) repeating steps (i)–(j) if it is determined that the players' theme game results have not achieved the second predetermined objective and the second predetermined event has not yet occurred;

(l) controlling the gaming machines to terminate the theme game if the second predetermined event has occurred before the second predetermined objective is achieved; and (m) providing a proportional share of a jackpot to each player if in step (j), it is determined that the players' combined theme game results have achieved the second predetermined objective before the occurrence of the second predetermined event.

14. The interactive gaming process according to claim 13 wherein the wagering game comprises a video slot machine having a plurality of reels and a pay-line, each reel of the video slot machine having a first set of indicia that represents features that pertain to the theme game.

15. The interactive gaming process according to claim 14 wherein each gaming machine includes a display screen, and wherein configuring step (b) comprises the step of configuring each display screen to a first display screen configuration.

16. The interactive gaming process according to claim 15 wherein the first display screen configuration comprises images of (i) the video slot machine, (ii) a first window that displays the progress of the players in achieving the first predetermined objective, and (iii) a second window for indicating the occurrence of the first predetermined event.

17. The interactive gaming process according to claim 16 wherein when any player receives a predetermined combination of indicia of the first set at the pay-line, the players' progress in achieving the first predetermined objective is furthered.

18. The interactive gaming process according to claim 14 wherein configuring step (h) comprises the step of configuring each display screen to a second display screen configuration.

19. The interactive gaming process according to claim 18 wherein configuring step (h) further comprises the step of configuring the reels of the video slot machine to display a second set of indicia.

20. The interactive gaming process according to claim 19 wherein the second display screen configuration comprises images of (i) the video slot machine wherein each reel has the second set of indicia, and (ii) a window that indicates the players' progress in achieving the second predetermined objective.

21. The interactive gaming process according to claim 20 wherein when any player receives a first predetermined combination of indicia of the second set at the pay-line, the players' progress in achieving the second predetermined objective is furthered and wherein when any player receives a second predetermined combination of indicia of the second set at the pay-line, the players' progress in achieving the second predetermined objective is hindered.

22. The interactive gaming process according to claim 21 wherein controlling step (l) further comprises the step of controlling each gaming machine such that the display screen of each gaming machine indicates the theme game has ended.

23. An interactive gaming process comprising the steps of:

(a) providing a gaming system comprising:

(i) a plurality of gaming machines to be played by a corresponding plurality of players, each gaming machine having a wagering game and a theme game, the wagering game having features that correspond to the theme game wherein the results of the wagering game influence the results of the theme game, and (ii) a controller for electronically linking the gaming machines and providing stimuli to each gaming machine so as to effect gaming machine outputs that are impartial and random;

(b) configuring the gaming machines to a first pay-out mode;

(c) activating each gaming machine to effect play of the wagering game wherein each gaming machine is activated by a corresponding player;

(d) controlling each gaming machine to use the results of the wagering game to simultaneously play and influence the results of the theme game;

(e) determining if any player's theme game results meet a first predetermined criteria and designating that player as the winner;

(f) repeating steps (c)–(e) if it is determined that there is no winner;

(g) configuring the winner's gaming machine to a second pay-out mode;

(h) activating the winner's gaming machine to effect play of the wagering game wherein the gaming machine is activated by the winner; and (i) providing a monetary award to the winner based upon the results of the wagering game.

24. The interactive gaming process according to claim 23 wherein each gaming machine includes a display screen.

25. The interactive gaming process according to claim 24 wherein the wagering game comprises a video slot machine having a plurality of reels and a pay-line, each reel of the video slot machine having a first set of indicia that represents features that pertain to the theme game.

26. The interactive gaming process according to claim 25 wherein configuring step (b) comprises the step of configuring the display screen of each gaming machine to display a first display screen configuration.

27. The interactive gaming process according to claim 26 wherein the first display screen configuration comprises (i) the video slot machine having a plurality of reels having a first set of indicia, (ii) a status window that has a plurality of images representing vehicles, the status window further including indicia associated with each vehicle that identifies a particular player, and (iii) an action window that displays interaction of the vehicles displayed in the status window.

28. The interactive gaming process according to claim 27 wherein the status window further includes at least one vehicle component image that is associated with each vehicle image.

29. The interactive gaming process according to claim 28 wherein the first predetermined criteria comprises the destruction of a predetermined number of competing players' vehicles.

30. The interactive gaming process according to claim 29 wherein a vehicle is destroyed when the vehicle component image associated with that vehicle disappears from the status window.

31. The interactive gaming process according to claim 30 further including the step of displaying in the action window collisions between the vehicles displayed in the status window.

32. The interactive gaming process according to claim 31 wherein a player's vehicle component image will disappear if that player's vehicle is displayed in the action window as being struck by another player's vehicle and the combination of indicia at the pay-line indicate that particular vehicle component.

33. The interactive gaming process according to claim 25 wherein configuring step (g) further comprises the step of configuring the display screen to display video slot machine reels that have a second set of indicia.

34. The interactive gaming process according to claim 33 wherein activating step (h) comprises spinning the reels of the video slot machine only once.

35. The interactive gaming process according to claim 34 wherein providing step (i) comprises providing a monetary award to the winner based upon the combination of indicia of the second set at the pay-line.

36. A gaming process for use with the internet comprising the steps of:

(a) providing a gaming system comprising:

(i) a plurality of gaming machines to be played by plurality of players, each gaming machine being configured to display (i) a video slot machine having a plurality of reels and a pay line, and (ii) a theme game, each reel having indicia thereon that corresponds to the theme game wherein the results of the theme game are influenced by the combination of indicia at the pay-line after the reels are spun, and (ii) a controller remote from the gaming machines for electronically linking the gaming machines and providing stimuli to the gaming machines so as to effect video slot machine outputs that are impartial and random;

(b) creating a wager account for each player;

(c) depositing funds into each wager account;

(d) configuring the gaming machines to a first pay-out scheme;

(e) activating each gaming machine to effect spinning of the reels of the video slot machine wherein each gaming machine is activated by a corresponding player;

(f) thereafter, deducting from each wager account a sum representing a wager;

(g) controlling each gaming machine to use the results of the wagering game to simultaneously play and influence the results of the theme game;

(h) determining if there is a player whose theme game results meet a first predetermined criteria;

(i) repeating steps (e)–(h) if it is determined that there is no player whose theme game results meet the first predetermined criteria;

(j) designating the player whose theme game results meet first predetermined criteria as the Leader;

(k) configuring the gaming machines according to a second pay-out scheme;

(l) activating the gaming machines to effect spinning of the reels of the video slot machine wherein each gaming machine is activated by a corresponding player;

(m) playing the theme game according to the resulting combination of indicia at the pay-line after each spin of the reels;

(n) determining if the current Leader's theme game results still meet the predetermined criteria;

(o) repeating steps (e)–(n) if it is determined in step (n) that the current leader's theme game results no longer meet the predetermined criteria;

(p) determining if any of the players' theme game results meet a second predetermined criteria if it is determined in step (n) that the current leader's theme game results still meet the first predetermined criteria;

(q) repeating steps (l)–(p) it is determined that there is no player whose theme results meet the second predetermined criteria; and (r) providing a proportional share of a jackpot to each player if in step (p), it is determined that there is a player whose theme game results meet the second predetermined criteria.

37. The process according to claim 36 further including step (s) of repeating steps (b)–(r) after the shares of the jackpot are distributed.

38. The process according to claim 36 wherein step (i) further comprises:

determining if each player desires to continue activating his or her respective gaming machine if it is determined that there is no player whose theme game results meet the first predetermined criteria; and configuring to a cash-out mode any gaming machine of a player who does not desire to continue activating his or her gaming machine.

39. The process according to claim 36 wherein step (q) further comprises the steps of:

determining if each player desires to continue activating his or her respective gaming machine if it is determined that there is no player whose theme game results meet the second predetermined criteria; and configuring to a cash-out mode any gaming machine of a player who does not desire to continue activating his or her gaming machine.

40. An interactive gaming system comprising:

a plurality of gaming machines to be played by plurality of players, each gaming machine having a wagering game and a theme game, the wagering game having features that correspond to the theme game wherein the results of the wagering game influence the results of the theme game as the wagering game is being played;

a controller for electronically linking the gaming machines and providing stimuli to the gaming machines so as to effect gaming machine outputs that are impartial and random;

means for configuring the gaming machines to a first pay-out scheme;

means for activating each gaming machine to effect play of the wagering game;

means for controlling each gaming machine to use the results of the wagering game to simultaneously play and influence the results of the theme game;

first means for determining if there is a player whose theme game results meet a first predetermined criteria;

means, responsive to the first determining means, for designating the player whose theme game results meet the first predetermined criteria as the Leader;

means for configuring the gaming machines according to a second pay-out scheme when the designating means designates a player as the Leader;

means for activating the gaming machines to effect play of the wagering game in the second pay-out scheme;

means for controlling each gaming machine to play the theme game according to the results of the wagering game;

second means for determining if the current Leader's theme game results still meet the first predetermined criteria;

third means for determining if any of the players' theme game results meet a second predetermined criteria; and means, responsive to the second and third determining means for providing a proportional share of a jackpot to each player in the group of players if the current Leader's theme game results still meet the first predetermined criteria, and at least one of the players' theme game results meet a second predetermined criteria.

41. The system according to claim 40 further means, associated with each gaming machine, for placing a wager.

* * * * *